United States Patent
Baran et al.

[19]

[11] Patent Number: 6,049,693
[45] Date of Patent: Apr. 11, 2000

[54] UPSTREAM INGRESS NOISE BLOCKING FILTER FOR CABLE TELEVISION SYSTEM

[75] Inventors: Paul Baran, Atherton; George K. Bunya, Morgan Hill; F. Jud Heinzmann, Los Altos; Marshall H. Hollimon, Cupertino, all of Calif.

[73] Assignee: Com21, Inc., Milpitas, Calif.

[21] Appl. No.: 08/892,090

[22] Filed: Jul. 14, 1997

Related U.S. Application Data

[63] Continuation-in-part of application No. 08/699,888, Aug. 15, 1996.

[51] Int. Cl.[7] .............................. H04N 7/10; H04N 7/14
[52] U.S. Cl. ............................. 455/3.1; 348/12; 348/10
[58] Field of Search ................ 455/3.1, 5.1; 348/12, 348/10, 6, 608; 340/600; H04N 7/10, 7/14

[56] References Cited

U.S. PATENT DOCUMENTS

| | | | |
|---|---|---|---|
| 4,520,508 | 5/1985 | Reichert, Jr. .............................. | 348/11 |
| 5,233,418 | 8/1993 | Gumm et al. ............................... | 348/6 |
| 5,408,259 | 4/1995 | Warwick .................................. | 348/12 |
| 5,420,527 | 5/1995 | Naber ..................................... | 326/32 |
| 5,499,047 | 3/1996 | Terry et al. .............................. | 348/12 |
| 5,561,404 | 10/1996 | Ross ...................................... | 333/28 |
| 5,585,842 | 12/1996 | Chappel et al. ........................... | 348/6 |

*Primary Examiner*—Nathan Flynn
*Assistant Examiner*—Vivek Srivastava
*Attorney, Agent, or Firm*—Townsend and Townsend and Crew LLP; Kenneth R. Allen

[57] ABSTRACT

A plurality of intelligently-controlled frequency-domain filters or ingress noise blockers are disposed in serial connection to coaxial cable at feeder tap locations that connect each household node to the cable. Each filter is operative in the absence of upstream signals from the local node to block ingress energy in the upstream band and is responsive to energy produced by injected upstream signals in the upstream band only from the associated local node to unblock and thus pass information signals into the upstream band. The filter employs as its blocking/unblocking mechanism an active switch whose control signal, as well as power source, is the energy of the injected upstream signal, which may be largely the information-containing signal from the associated local node which is to be gated through to the head end. The switch is able to respond quickly to microvolt level signals. The active switch is preferably a depletion-mode-type field effect transistor (depletion mode FET). The present invention, including the strategic placement of the smart filters and the smart filters themselves, does not require a separate external power supply nor a constant source of phantom power.

4 Claims, 13 Drawing Sheets

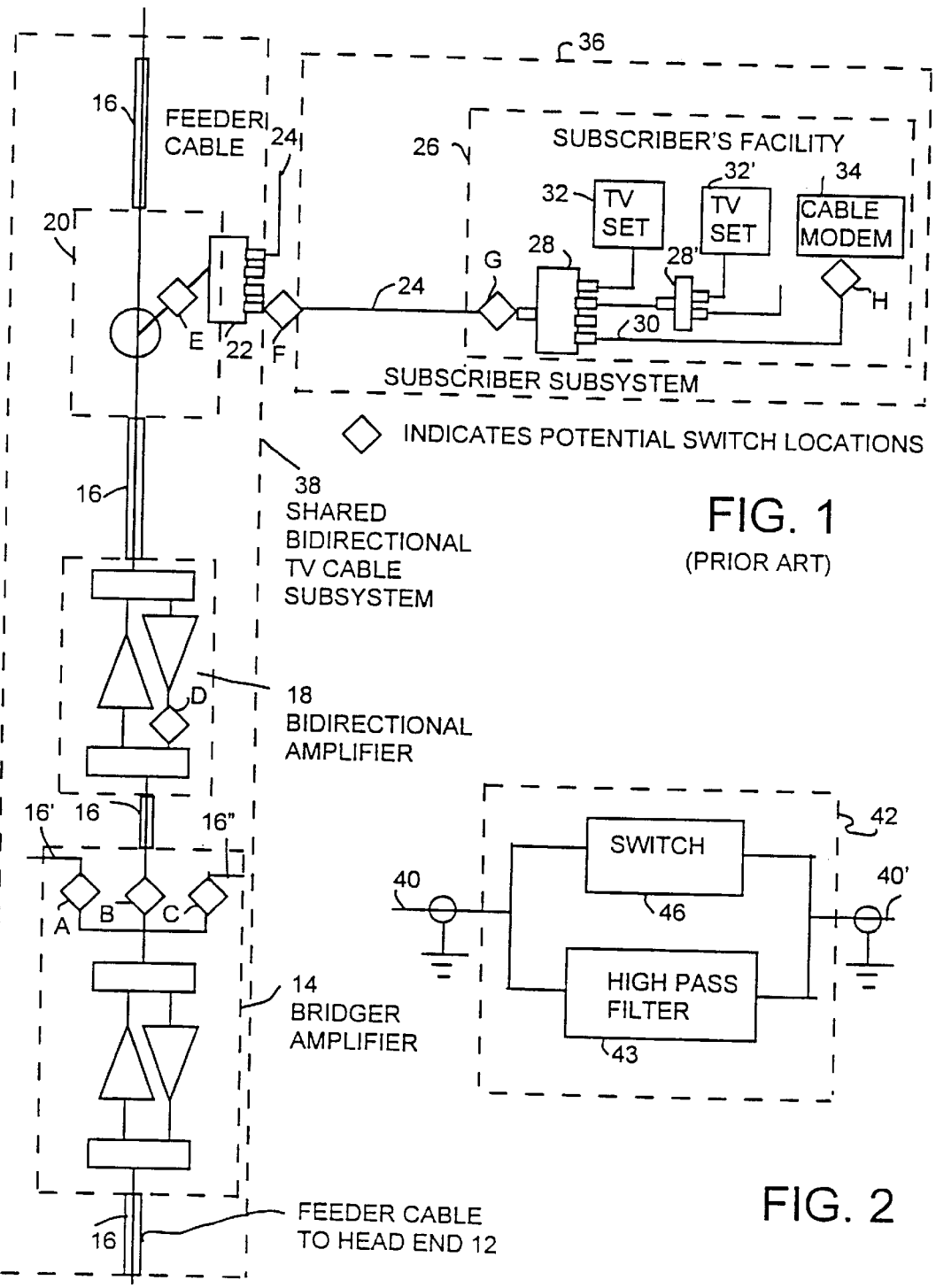

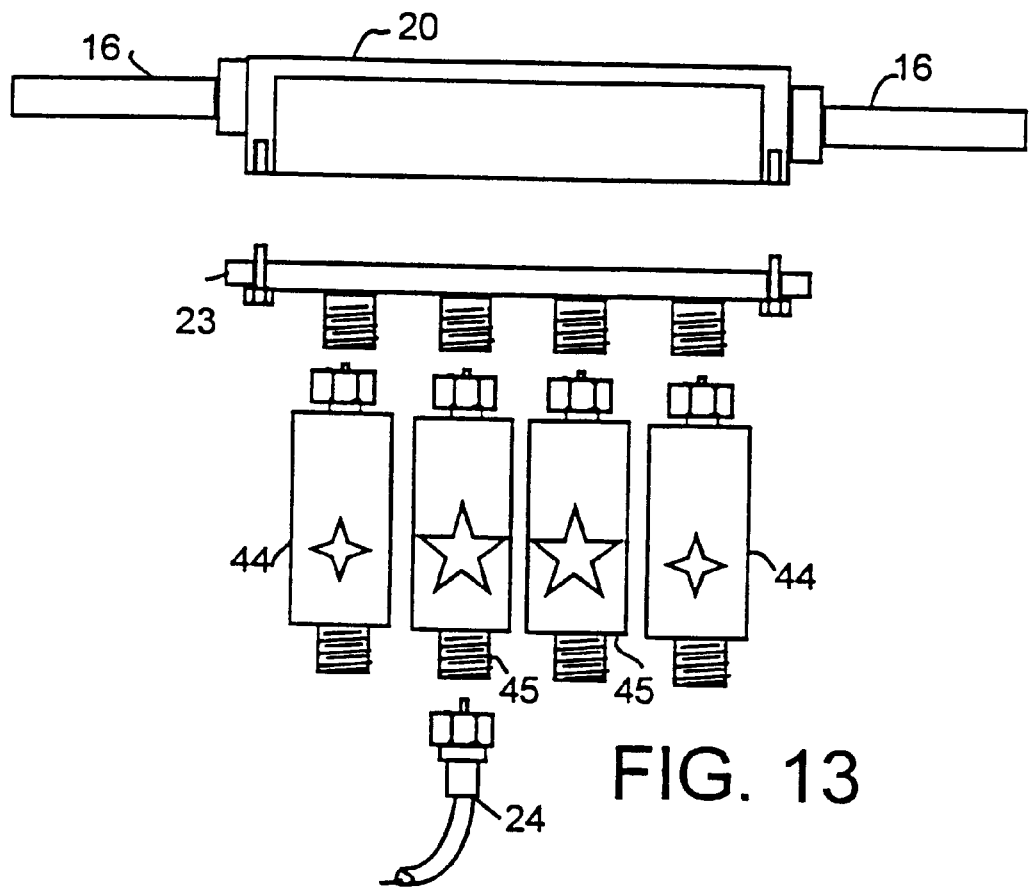
FIG. 13
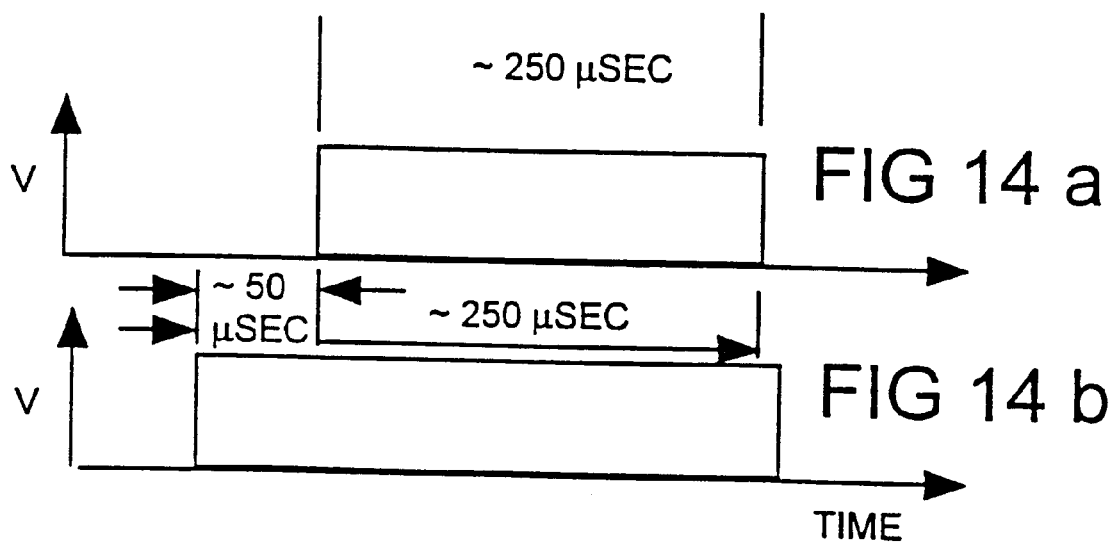
FIG 14 a
FIG 14 b

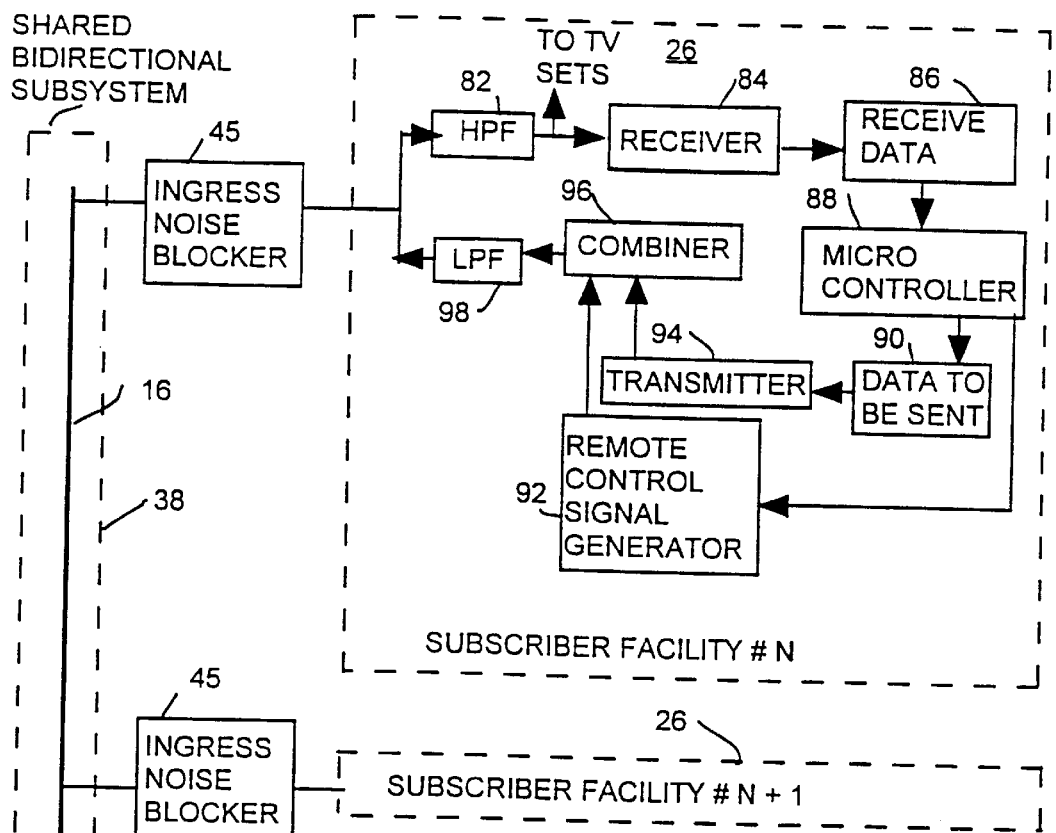
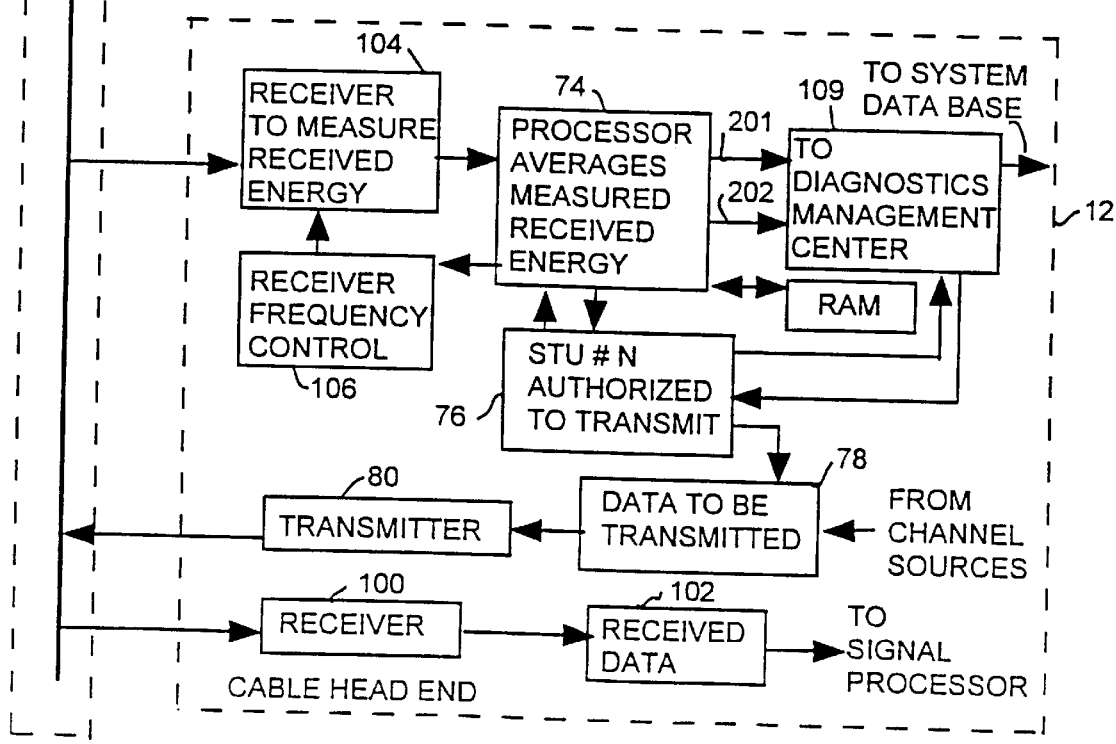
FIG. 16

UPSTREAM INGRESS NOISE BLOCKING FILTER FOR CABLE TELEVISION SYSTEM

CROSS REFERENCE TO RELATED APPLICATION

This application is a continuation-in-part of Ser. No. 08/699,888 filed Aug. 15, 1996 in the names of Paul Baran, George Bunya, Jud Heinzmann and Marshall H. Hollimon entitled TV AND DATA CABLE SYSTEM INGRESS NOISE BLOCKER, the content of which is incorporated by reference.

BACKGROUND OF THE INVENTION

This invention relates generally to two-way cable systems carrying digital signals using cable modems, as well as carrying video broadcast signals, and more specifically this invention relates to blocking and isolating upstream ingress noise on cable systems.

Two-way cable modems provide the digital signal interface between digital computing devices and cable systems, typical coaxial systems carry an array of analog and digital signals according to a predefined frequency plan. As such, cable modems operate in a hostile signal environment wherein the upstream cable channels are subject to varying levels of uncontrollable ingress-noise. While careful plant maintenance is needed to minimize the error causing effects of such noise, there are nevertheless many older cable systems that are considered unacceptable candidates for reliable two-way transmission. The cumulative noise level and the lack of an easy way to determine the source of such noise and to correct its cause substantially reduce the viability and value of such systems for two-way digital communications.

In the downstream direction, cable systems are similar in operation to a water distribution system. Signals are distributed like water flowing under pressure which is split into a myriad of smaller and smaller pipes to reach each house. In the reverse direction, upstream, cable systems are analogous in operation to a sewage system. Signals and noise, like effluent and sewage from each hook-up, contributes to a common flow gathered together by the system to feed a common point. In the case of a cable system, it is the headend, where it is desirable to extract signals from noise. Electrical noise pollution from any single house, hookup or ingress point can thus poison the common upstream channel for all subscribers in that accumulating path. Once polluted, discovering the source of that pollution has been a highly manual-labor intensive effort.

Seventy-five percent or more of the noise which impinges on an upstream channel is ingress noise typically generated within the home hookup. The cable plant operator has little or no control over such sources of spurious electrical interference. An estimated fifteen to twenty percent of the noise is attributable to the typically poor wiring and poor isolation provided by the common low-cost, flexible drop cables using inexpensive F-connectors used to connect the hookups to taps on the solid aluminum sheathed feeder cables passing the houses parallel to the street, also giving rise to ingress noise from adjacent sources. Only a small percentage of the noise is due to ingress into the feeder cable portion of the cable system. Such noise is relatively easy to control as part of regularly-required field maintenance. (A technician can detect leaks by driving along the feeder cable and listening on a monitor to a cable frequency. Egress and ingress are two manifestations of the same phenomenon and are proportional to one another.)

The causes of the noise within a subscriber's premises can be as varied as do-it-yourself cable wiring, light dimmers, universal electric motors with sparking brushes, poor electrical power wiring and inadequate grounding. The obvious problem of access to a subscriber's premises is compounded further in that the noise is often intermittent.

A heavy price is already being paid by the cable industry to address limitations of the upstream channel. For example, the cable industry has tentatively chosen to use QPSK modulation in the upstream direction for two-way data communication. QPSK modulation has only about ⅓ of the data carrying capacity as 64-QAM modulation, which is the preferred standard downstream modulation.

Another high price being paid is the necessity of reducing the number of houses connected to a common cable in a preferred hybrid fiber coax (HFC) system configuration. To reduce the number of households on any coaxial cable feed, fiber optic cables must be extended further into the cable plant to join the coaxial tails to correspondingly reduce the number of cable line amplifiers and houses connected on any single upstream channel and thus reduce the potential sources of ingress noise. For example, when the number of houses per upstream channel is reduced to 500 from 5,000, the probability of noise from any single source destroying the common channel is reduced by a factor of ten. While an excellent partial solution, noise from a subscriber remains a significant risk factor.

So-called legacy cable systems are existing systems, some of which have been designed to use the spectrum below TV Channel 2 (i.e., 5–42 MHz), for upstream transmission. Experience has shown this to have been be a poor standard for transmission because of the frequency-specific ingress noise problem from sources in the ambient environment. What is needed is a viable approach to minimize ingress of noise to allow the effective use of this band for upstream transmission. The specific problem addressed by the invention is the better commercial utilization of the 5–42 MHz band (particularly the 5 to 20 MHz portion of that band), so prone to short-wave radio signal pickup, power line transients, harmonics and impulse noise.

DESCRIPTION OF PRIOR ART

Use Of High Pass Filters

The use of high pass filters to block low frequency ingress noise is known art. Small passive high-pass cylindrical filters having coaxial F-connectors are sometimes used in cable systems to block the 5–42 MHz range. Such filters are inexpensive, costing as little as two dollars each in very large quantities. These filters are often mounted at the cable modem, and sometimes before the first splitter, at the junction of the drop cable entering the house or at the tap. Such filters are preferentially mounted at the feeder taps so as to block upstream noise generated either in houses and ingress noise entering the system via a damaged drop cable or F-connector. A different arrangement is needed to serve those houses that have a two-way cable modem that must transmit signals upstream in that frequency range. Thus, a "smart" filter arrangement is desired to allow remote connection in synchronism with data to be transmitted upstream.

Several patents address this general problem, but a number of practical feasibility issues, described below, have limited the success in those approaches to date.

Dormans, in U.S. Pat. No. 3,924,187, issued Dec. 2, 1975, describes the controlling of signal bridger gates in series with the upstream paths to reduce the combined noise from a large number of subscribers. These gates time-share the upstream channel wherein each subscriber transmits during a predetermined-time interval following a master reference signal. Switching takes place at the bidirectional amplifier locations, where upstream and downstream signals are separately available. Dormans describes switching off feeder transmission legs to prune out inactive portions of the network, implicitly at the network bridger points. Dormans discusses two implementations. In one, command receivers are used to decode the control information from the headend. In another implementation, a control signal is provided from a subscriber unit in the form of composite upstream data and pilot tone, with both components being required to be present within a narrow band to open a bridger gate.

Andou, Japanese Patent No. JA 59-161937, issued Sep. 12, 1984, describes the prevention of noise buildup in the transmission of upstream video signals by first rectifying the upstream video signal to create a control signal. Andou uses the control signal to enable a switch in the upstream direction. Implicitly, this invention performs the filtering and switching function at the bidirectional amplifier location where the upstream and downstream signals are each separately available. The objective of the gating is to prevent noise buildup from many separate subscriber facilities by not sending upward any signal other than a clearly valid waveform. This implicitly assumes that the undesired noise has a lower amplitude than the signal, (i.e. a random Gaussian type noise). Andou does nothing to handle ingress noise of greater magnitude than the signal itself.

Geshi, Japanese Patent No. JA 60-171884, issued Sep. 5, 1985, discusses a somewhat similar solution. Geshi, however, accepts the upstream signal via a band-pass filter and then frequency shifts the upstream signal. The same differences and limitations apply to this approach as discussed above in relation to the Andou approach.

Yamazaki, Japanese Patent No. JA 63-123239 issued Jul. 27, 1988, discusses an approach similar to the Andou and Geshi approaches. However, Yamazaki detects the upstream signal and then re-modulates that signal to develop a new noise-reduced upstream signal.

Ohue, U.S. Pat. No. 4,928,272, issued May 22, 1990, teaches the use of "transmuxiplier" converters at the branching junctions of the cable system to convert upstream frequency division signals into time division signals. The objective here is to be able to use bridger gates that switch in the time domain, thus allowing signals from each branching trunk to be sent upstream separately and sequentially so that only one noise source at a time is connected in the upstream direction. This use of bridger switching to reduce noise is limited if the upstream signals are frequency division multiplexed. In this case, conversion from frequency division into time division signals is not applicable if there are multiple frequency division signals present.

Dufresne et al., U.S. Pat. No. 4,982,440 and its division U.S. Pat. No. 5,126,840 issued Jun. 30, 1992 describe solutions which seek to reduce the upstream noise level from a large number of multiple sources by the use of very narrow band-pass filters to pass only the expected upstream signals and the use of a gate, together with very narrow band-filters wherein, if the energy in each passband is greater than a threshold, the upstream gate is opened. In another embodiment, a pilot tone is also sent. If the pilot tone and a signal are both present the upstream switch opens. In yet another embodiment, the gates can be opened and closed selectively by signals received from the headend with each switch having a separate address. The complexity of the various embodiments suggest that the solutions would be relatively expensive and power-consumptive, which is not possible or desirable in many environments.

SUMMARY OF THE INVENTION

According to the invention, in a two-way cable television and data distribution system, a plurality of intelligently-controlled frequency-domain filters, which herein are called smart filters or ingress noise blockers, are disposed in serial connection to coaxial cable at feeder tap locations that connect each household node to the cable. Each smart filter is operative in the absence of upstream signals from the local node to block ingress energy in the upstream band and is responsive to energy produced by injected upstream signals in the upstream band only from the associated local node to unblock and thus pass information signals into the upstream band. The intelligent filter employs as its blocking/unblocking mechanism an active switch whose control signal, as well as power source, is the energy of the injected upstream signal, which may be largely the information-containing signal from the associated local node which is to be gated through to the head end. An important feature of the active switch is its ability to respond quickly to microvolt level signals. To this end, the preferred embodiment of the active switch is a depletion-mode-type field effect transistor (depletion mode FET). The smart filter is not only responsive to low level signals, but it presents a good impedance match to the cable network in either the open or the closed state, thus enabling good isolation as well as low reflections and full bandwidth access.

The present invention, including the strategic placement of the smart filters and the smart filters themselves, does not require a separate external power supply nor a constant source of phantom power. It is extremely cost-effective. It is exceptionally effective in isolating sources of undesired noise. It is also useful in pinpointing most sources of unwanted noise, since such noise is largely attributable to sources limited to feeder tap locations. Remote diagnostics can be used to poll individual tap locations and monitor for noise during responses received from the tap locations, as the smart filters unblock the upstream band. Only during the short intervals when data is actually being transmitted by that subscriber is the upstream band of that tap location open.

Upstream transmission is preferably in the form of short high data rate bursts, or packets. It is also important that the switching process not cause visible impairments (visible switching artifacts) in the higher frequency TV signals, as viewed on a television. The present invention uniquely prevents loss of picture quality in part by placing the switching element in a position buffered by low pass filters to block all energy in the TV band. Additionally, the present invention ingress noise blocker is small enough to be packaged to fit current feeder taps. TV cable feeder taps are generally manufactured in the form of die cast housings connected in line with a solid sheathed feeder cable. The typical tap is built with a removable face plate. The ingress noise blocker can also be packaged to fit into such a typical exchangeable face plate assembly to reduce cost and simplify installation.

A feature of the present invention is the improved ability to locate noise sources by correlating the noise received at the cable headend during that time interval each modem is authorized to transmit. If a time-to-location correlation is found, then it is inferred that the source such noise ingress is the facility containing the modem authorized to transmit at those exact instants corresponding to the noise being received. Thus, correlating the frequency and time patterns determines the location of the ingress noise, and the location and possible cause of the noise.

The present invention also permits the use of a simple remote control signal circuit arrangement to allow a simple retrofit of existing TV cable modems to provide the necessary ingress noise blocker activating signal.

This invention may be better understood by reference to the following detailed description with reference to the accompanying drawings:

BRIEF DESCRIPTION OF THE DRAWINGS

FIG. 1 is a simplified schematic view of the prior art TV cable system showing sources of ingress noise and potential locations where high pass filters can be, or have been, used in the past.

FIG. 2 is a simplified schematic showing the basic concept of bypassing a high pass filter to allow transmission of upstream signals.

FIG. 13 is a modified version of FIG. 3 including both high pass filters and ingress noise blockers to accommodate cable system subscribers who have purchased different services.

FIGS. 14a and 14b are timing diagrams showing a transmitted packet time interval and the use of a precursor initiated remote control signal.

FIG. 16 is a block diagram of the system arrangement used to pinpoint the location of the source of ingress noise.

DESCRIPTION OF SPECIFIC EMBODIMENTS

Figure 3:
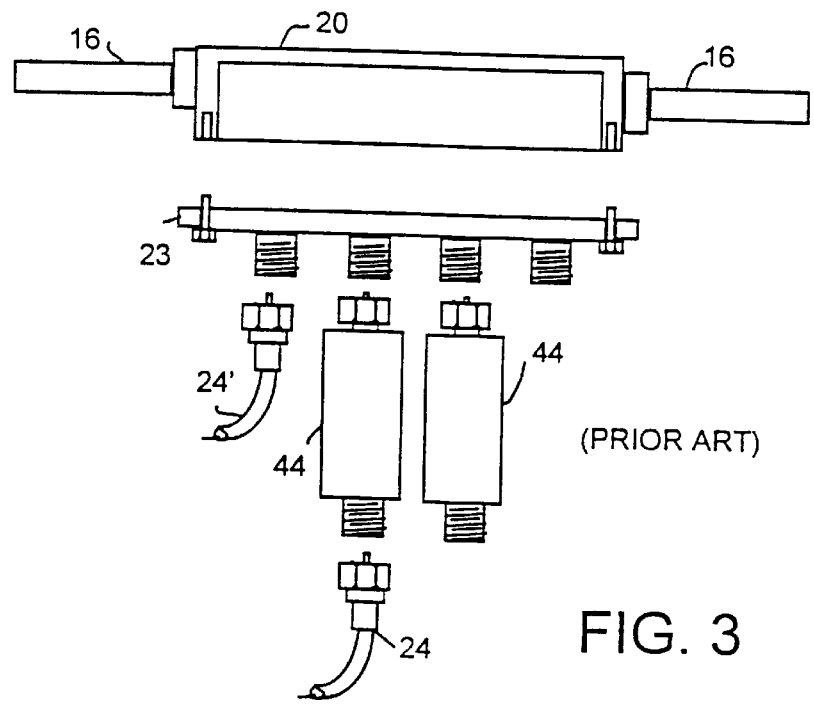
FIG. 3 is a pictorial sketch showing conventional high pass filters of the prior art connected to the feeder tap drop cable to block upstream noise.

For purposes of reference, FIG. 1 is provided, namely, a simplified schematic of the downstream portion of a TV cable system of the prior art. The upstream-headend 12 of the system provides a downstream signal, via a feeder cable 16 to one or more bridger amplifiers 14 from which a plurality of branching trunks emanate, each carrying the signal feed from headend 12 to a continuing feeder cable 16, 16', 16", etc. Then, at selected intervals along feeder cable 16 there are bidirectional amplifiers 18 to boost the signal level as it travels further from headend 12 and as signals are split off via feeder taps 20 to one or more subscribers and for the upstream signal return on feeder cable 16. Connection between feeder tap 20 and each subscriber's in-facility wiring 30 is accomplished with a drop cable 24 that is connected between splitter 22 of feeder tap 20 and splitter 28 within the subscriber's facility 26. From splitter 28 the subscriber's facility 26 is wired with coaxial cable 30 to connect to one or more TV sets 32, perhaps a cable modem 34 and a secondary splitter 28' to which other TV sets and other devices may be connected. The common shared portion of the cable system, for convenience in further discussion, is called a "shared bidirectional subsystem" 38 and the portion unique to each subscriber facility is called a "subscriber system" 36.

As discussed above, noise in the upstream direction is a serious problem because each subscriber facility passed by feeder cable 16 adds some upstream noise. Additionally, the upstream transmission from Subscribers is in the 5 MHz to 42 MHz band. The use of that band for upstream transmission is susceptible to noise ingress from a large number of low frequency noise sources, such as electric motors, high frequency radio broadcasting, etc., many of which are present in residential structure electrical power wiring sharing a grounding wire with the TV cable equipment. Additionally, poorly installed connectors and shielding breaks at splitters 28 and 28' and in drop cable 24 also provide points of noise ingress, as do improperly installed connectors attached to splitters 22 of feeder tap 20.

Thus, as upstream noise is to be minimized, a switching arrangement for the 5 MHz to 42 MHz frequency band is necessary since the noise sources can not easily be found and removed. Locations for such band switching could be provided at any of various locations in the typical TV cable system as shown in FIG. 1. Those locations are illustrated with diamonds A–H. Locations A, B and C being shown in the three branching trunks of bridger amplifier 14; D in each of bidirectional amplifiers 18; E in each tap path of each feeder tap 20; F and G at either end of each of drop cables 24; and H at the output terminal of the subscriber cable modem 34.

Since 75% to 80% of the ingress noise is contributed by sources in or around the subscriber's facility 26, a switch in the upstream direction on the output of cable modem 34 would eliminate the majority of that noise ingress, provided that the subscriber has such a modem. However, if the subscriber does not have a cable modem, noise is just as likely to be contributed from those sites, so it is desirable that high pass filters without switches be used at such subscriber facilities. Locations A through D would cover both types of subscribers, those with and those without cable modems 34 (i.e., those with and without upstream transmission capability), as well as picking up additional noise suppressions for that 15% to 20% of noise contributed by drop cable 24, but this not only disconnects a single subscriber facility or a few subscriber facilities, but rather large sections of the cable system and are hence less desirable than disconnecting only one or a few subscriber facilities.

However, as described above, a leaky junction or feeder cable 16 is easy to identify by well known drive-by techniques. This is done by identifying points using a radio receiver where a downstream signal leaks out. If a downstream signal leaks out, then it is a likely ingress point of upstream noise. As will be seen from the following discussion, the advantages of locating a noise blocking device of the present invention at location F is the ability to single out which subscriber is contributing the unwanted noise with little additional ingress compared to locations A to E. Thus, to retain that added advantage, as well as suppressing the greatest amount of downstream noise, location F is chosen as the optimum location for the ingress noise blocker of the present invention. It should be noted that location E would be nearly as advantageous. The problem of locations H and G is that they allow ingress leakage if drop cable 24 or its connectors are defective.

FIG. 2 is a simplified schematic showing the basic concept of a switched upstream noise blocker 42 that includes two sections. A high pass filter section 43 with a switch section 46 is connected in parallel with high pass filter section 43 to allow the transmission of upstream signals when switch section 46 is conductive, thus bypassing high pass filter 43. In simplified terms, high pass filter 43 is provided to pass downstream signals from headend 12 to each subscriber via connectors 40 and 40', while switch 46 is provided to bypass high pass filter 43 when a subscriber has an upstream signal to transmit to headend 12. Thus, if switched filter 42 is located at any of points A, B, C, D or E, switch 46 needs to be conductive whenever any subscriber downstream from that point is sending information upstream to headend 12 whereas if switched filter 42 is located at point F, or H, switch 46 only needs to be conductive when a single subscriber downstream from, or at that location, is sending information upstream to headend 12. While the concept of FIG. 2 is correct, switch 46 causes interaction with the high pass filter.43. This must be removed. In practice the frequency band of 5–42 MHz is used for upstream transmission.

FIG. 3 illustrates the prior art implementation of the discrimination between subscribers that have downstream service only, as opposed to subscribers that have both downstream and upstream service. In the top portion of FIG. 3 there is an exploded view of a feeder tap 20 connected serially between two portions of feeder cable 16 with connector base plate 23 shown separated from feeder tap. Then, in the lower portion of FIG. 3 there is shown an exploded view of connector base plate 23 and the connection of various subscriber drop cables 24 and 24' thereto. For subscribers who have only contracted for the basic downstream service, a cylindrical removable high pass filter 44 is connected serially between one of the connectors on base plate 23 and the drop cable 24 that connects to that subscriber's facility 26. Similarly, for full service subscribers in prior art systems, the high pass filter 44 is omitted and that subscriber's drop cable 24' is connected directly to a connector on base plate 23.

Figure 4:
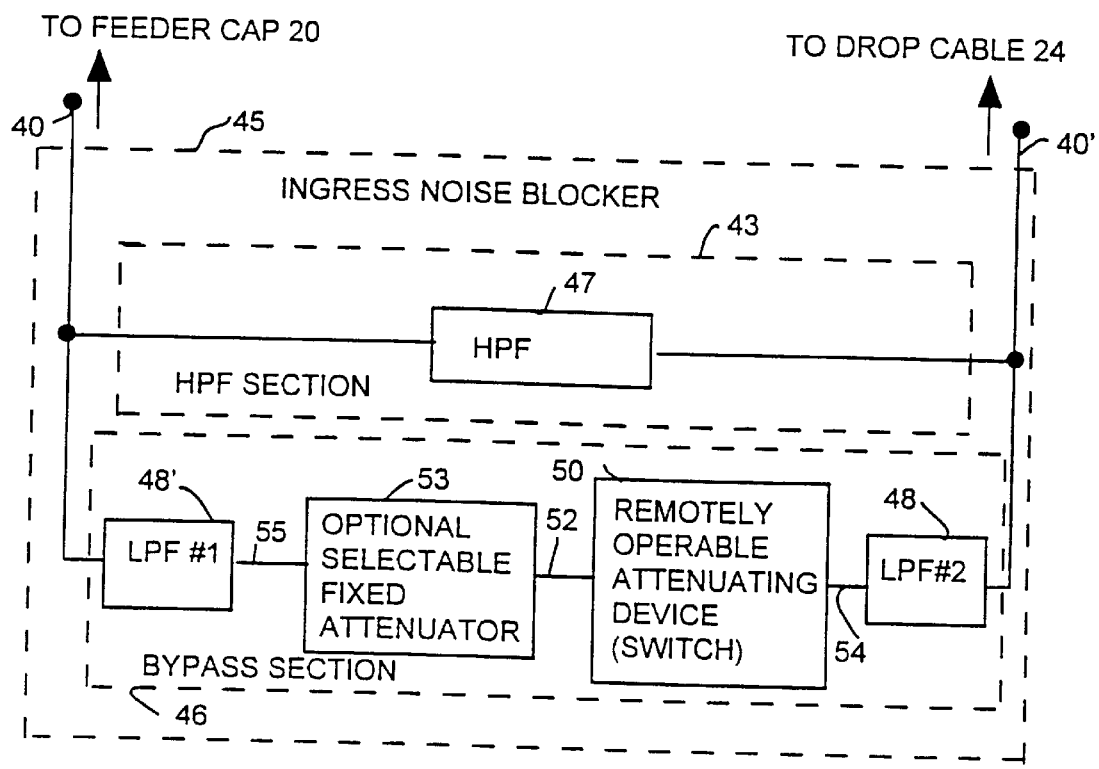
FIG. 4 is a block diagram of the ingress noise blocker of the present invention.

FIG. 4 is a block diagram of an ingress noise blocker 45 of the present invention that is shown in more detail than the general block diagram 42 of FIG. 2 with the reference numbers for the similar sections carried over to FIG. 4. In actual operation, ingress noise blocker 45 is connected serially between a feeder tap 20 via connector 40 and a drop cable 24 via connector 40'. Internally between connectors 40 and 40' are the two parallel connected sections: high pass filter section 43 and switch section 46 as in FIG. 2. High pass filter section 43 includes a high pass filter 47 that is designed to pass downstream TV signals in the frequency range above 50 MHz. Similarly, bypass section 46 consists of three or four serially connected elements (one being optional): a first low pass filter 48' having one terminal connected to connector 40 and a second terminal connected to line 55; a second low pass filter 48 having one terminal connected to connector 40', and a second terminal connected to line 54; a remotely operable attenuating device 50 (essentially a set of line-powered switches as discussed below) having one terminal connected to second lowpass filter 48 via line 54 and a second terminal connected to line 52; and an optional selectable fixed attenuator 53 connected between lines 52 and 55. (If attenuator 53 is not present lines 52 and 55 are the same line). In bypass section 46, each of low pass filters 48 and 48' are designed to pass upstream signals in the 5 MHz to 42 MHz band, as well as below 5 MHz, as when a corresponding subscriber's cable modem 34 sends a remote control signal to remotely operable attenuating device 50 as described in detail below.

Figure 5:
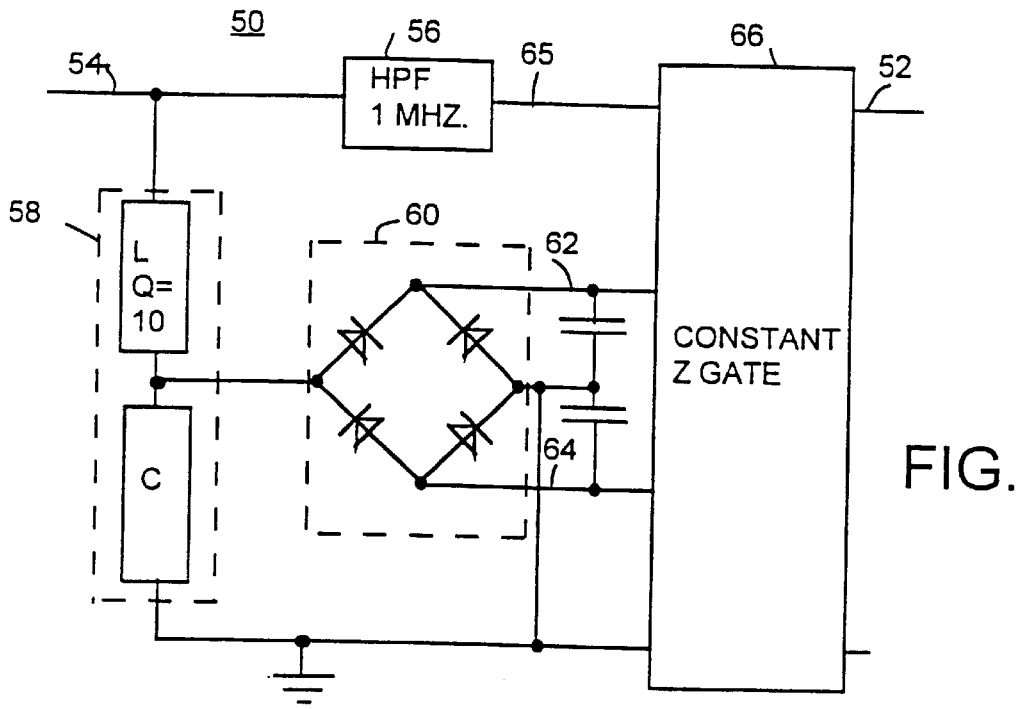
FIG. 5 is schematic block diagram of the switched attenuator or switching circuit of the ingress noise blocker of FIG. 4.

Referring next to FIG. 5, there is a block diagram representation of remotely operable attenuating device 50. Before discussing the components and their interconnection as shown in FIG. 5, the technique preferred for the present invention is as follows: The user through a local command activates remotely operable attenuating device 50 to pass signals by initiating a tone at the subscriber's cable modem 34 (FIG. 1). The tone is continuous at a frequency below the lowest upstream data frequency and is initiated at a time preceding the transmission of a data packet upstream with a remote control signal. The tone terminates concurrent with or following the end of the (last) data packet. One such technique is to add a 1 MHz tone that commences before transmission of the data packet, with that 1 MHz tone being received by and activating remotely operable attenuating device 50 sufficiently ahead of the upstream packet for any switching transients to dampen out.

Figure 19:
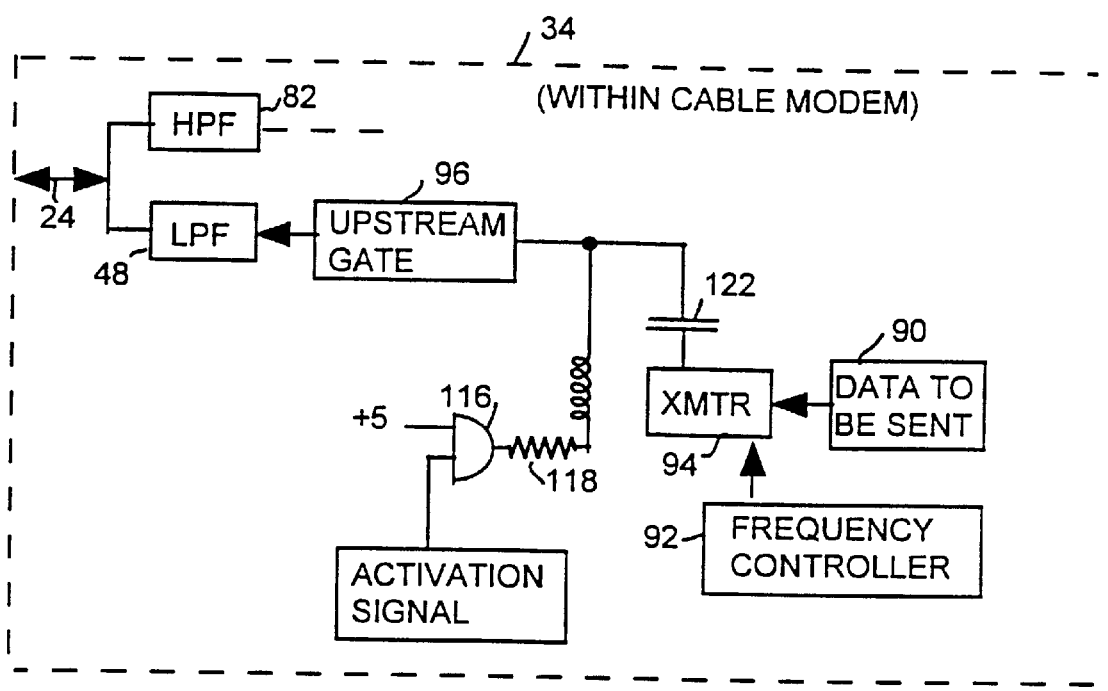
FIG. 19 is a schematic diagram similar to FIG. 18 with a DC voltage source replacing the AC source of FIG. 18.

In a second embodiment, as shown in FIG. 19, a DC signal is used instead of the 1 MHz tone. This technique is discussed further below.

As shown in FIG. 5, the remote control signal from the subscriber's cable modem 34, after it passes through second low pass filter 48, is applied on line 54 to the remotely operable attenuating device 50 according to the invention. Line 54 in turn is connected within remotely operable attenuating device 50 to a resonant tuned circuit 58 and a high pass filter 56 with a lower cut-off frequency (a frequency that is above 1 MHz and below 5 MHz). Thus, resonant tuned circuit 58 consists of a series connected inductor and capacitor with the amplitude of the voltage at the junction point between the inductor and capacitor being amplified according to the Q of the resonant circuit. If a Q of 10 is used then the gain factor is about 10, presenting, according to the invention, a signal that is large enough to be rectified by a rectifier 60 to produce a positive voltage output on line 62 and a negative voltage output (relative to ground) on line 64. The d.c. voltage between lines 62 and 64 in turn powers a constant impedance gate arrangement 66 as is discussed below. Resonant circuit 58 also acts as a tuned trap, removing most of the energy across its terminals so that there is very little signal that must be blocked by high pass filter 56.

In addition, the upstream leakage of the remote control signal is minimized by a high pass filter 56 that serves to pass only energy above that of the 1 MHz frequency tone. However, high pass frequency 56 has a low enough cut-in filter to pass the upstream data packet modulated at a frequency in the 5 MHz to 42 MHz upstream signal band. Thus, when the data packet follows the remote control signal, that signal is passed through high pass filter 56 and provided to gate 66 on line 65. The upstream data packet then passes through gate 66 which continues to maintain a path therethrough for at least the duration of the data packet. Leaving gate 66, the upstream data packet proceeds on line 52 (referring now to FIG. 4) to attenuator 53 (if present) and then through the first low pass filter 48' to connector 40 and on to drop cable 24 (not shown) via the feeder tap 20.

Figure 6:
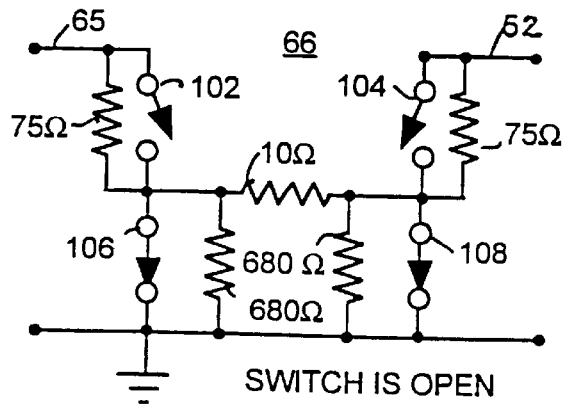
FIG. 6 is a schematic diagram of the circuits with impedances presented when the switching circuit of FIG. 5 is open.
Figure 7:
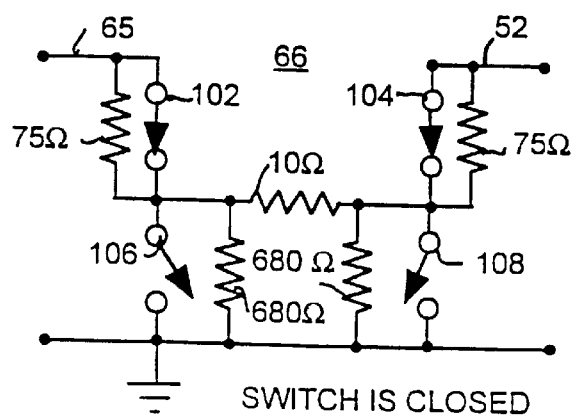
FIG. 7 is a schematic diagram of the circuits with impedances presented when the switching circuit of FIG. 5 is closed.

FIGS. 6 and 7 illustrate the structure and operation of constant impedance gate 66 of FIG. 5 and therefore should be viewed together, as they illustrate the two conduction states of gate 66. Given that in the subscriber subsystem of TV cable systems, the various elements are terminated in 75 ohms, as first and second low pass filters 48' and 48 would be, gate 66 is designed to retain that nominal impedance. (Gate 66 can be designed to match any selected termination impedance). Here, the two low-pass filters 48' and 48 are each terminated into 75 ohms, their nominal impedance. In FIGS. 6 and 7 gate 66 is depicted as a two-tier, four switch combination that retains a 75 ohm termination to both lines 65 and 52 whether gate 66 is conductive or non-conductive of the upstream packet signal. In the upper tier, connected to each of lines 65 and 52, are a pair of 75 ohm impedances, each with an upper tier switch 102 and 104, respectively, connected across the 75 ohm impedances. Additionally, there is a 10 ohm impedance serially connected between each 75 ohm/switch combination. In the lower tier there is also a pair of switch-impedance parallel combinations comprising lower tier switches 106 and 108 across 680 ohm resistive impedances connected between each end of the 10 ohm impedance and ground.

FIG. 6 illustrates the normally unenergized state of gate 66 with each of switches 102, 104, 106 and 108 without applied power to gate 66 from rectifier 60 (FIG. 5) and without application of the remote control signal (1 MHz tone in this embodiment). In this unenergized state, upper tier switches 102 and 104 are open, and lower tier switches 106 and 108 are closed. Thus, a 75 ohm termination impedance is provided to each of lines 65 and 52 to ground through closed switches 106 and 108, respectively.

Alternately, when a remote control signal has been received and gate 66 has been activated, each of switches 102, 104, 106 and 108 are energized and change state from the state for each shown in FIG. 6. Thus, in FIG. 7 there is a signal path provided between lines 65 and 52 via the closed upper tier switches and serially connected 10 ohm impedance, with that signal path isolated from ground by open lower tier switches 106 and 108 together with the 680 ohm impedances to ground. Thus, in the conductive mode, gate 66 provides a low impedance connection, on the order of 10 ohms, between the first and second low pass filters 48' and 48 with a relatively high impedance to ground through the two parallel 680 ohm impedances to ground. Therefore, effectively connecting the first and second low pass filters 48' and 48 together provides the optimum impedance and low attenuation for passage of the upstream data packet.

In FIG. 6, gate 66 is non-conductive and in FIG. 7, gate 66 is conductive. Thus, when implemented with an appropriate semiconductor gate according to the invention, the gates corresponding to switches 102 and 104 (such as depletion mode FETs) would be normally open, while the gates corresponding to switches 106 and 108 (e.g., sections of an SW239 switch, which is a quad of junction FETs) would be normally closed. When the control signal is received by remotely operable attenuation device 50, according to the invention, rectifier 60 is activated to power the gate equivalents of switches 102, 104, 106 and 108 from the power supplied by the control signal itself. Thereupon gate 66 switches to the conductive mode. It is important to be able to operate the filter as an active device without the addition of an external power supply. It is inconvenient and may well be impractical, if not prohibitively expensive, to provide a source of external power to a device according to the invention. By drawing power from the control signals already applied to the medium, considerable cost savings can be attained while providing substantial control versatility.

Any switching transient that may be presented by gates 102 through 108 is blocked by low pass filters 48 and 48' in ingress noise blocker 45 of the present invention. It is important to suppress switching transients in the TV band since they could cause visual artifacts since the packet duration operating time is on the order of a few line trace times of a conventional TV signal. The preferred embodiment of the active switch is a depletion-mode-type field effect transistor (depletion mode FET) because of its unique low voltage and low current requirements. One such useable device operative as a switch is a type 2N7002 MOS FET transistor. A network of such gates as switches is not only responsive to low level signals, but it presents a good impedance match to the cable network in either the open or the closed state, thus providing good isolation as well as low reflections and full bandwidth access.

It thus can be seen that no significant energy passes from terminals 65 to 52 unless a remote control signal has activated and indirectly powered the gate 66 for a period of time sufficiently long to permit the transmission of the upstream data packet. Also, it can be seen that both the first and second low pass filters 48' and 48 are properly terminated during both conduction modes of gate 66.

Additional techniques may further reduce the effects of ingress noise in TV cable systems in a manner relevant to the present invention. The upstream signal may be directed from cable modem 34 via drop cable 24 at a maximum signal level and then the upstream signal may be correspondingly attenuated prior to being transferred to the shared bidirectional TV cable subsystem 38. Thereby unwanted noise will be reduced by the same amount as the attenuation applied. However, if the attenuator is placed in series with drop cable 24, both the upstream and the downstream signals are both attenuated, which is to be avoided. However, since the upstream and downstream signals are isolated from each other in the ingress noise blocker 45 through switch section 46 and high pass filter section 47, respectively, as seen in FIG. 4, the selectable attenuator 53 can optionally be inserted serially between first and second low pass filters 48' and 48 to impact only the upstream signal. There are several alternative locations where such an attenuator can be added. One location is the serial location shown in FIG. 4. Another location is in series with the 10 ohm impedance in the 10/680/680 ohm pi network of gate 66 (FIGS. 6 and 7).

Figure 20:
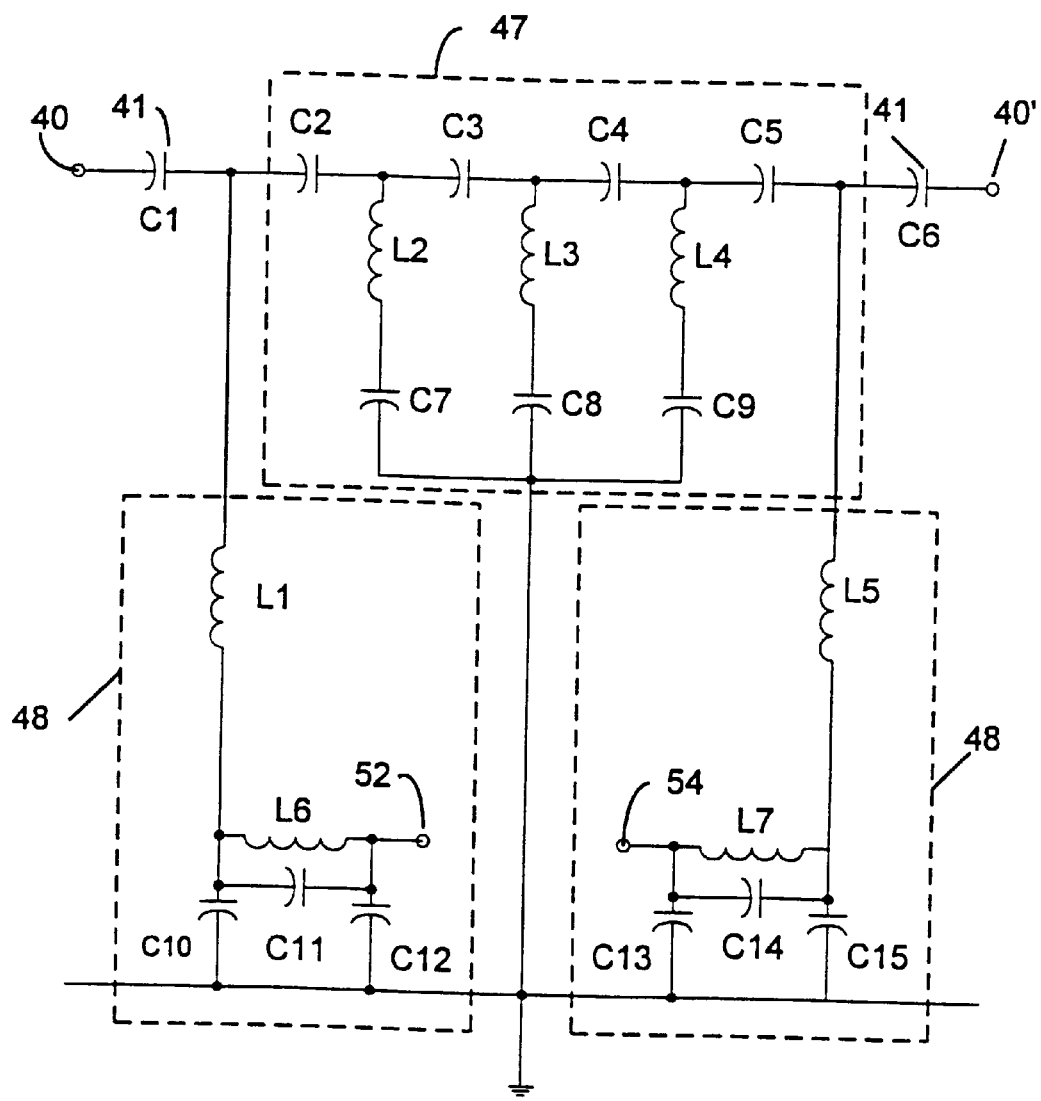
FIG. 20 is a detailed schematic diagram of the high and low pass filter sections of FIG. 4.

FIG. 20 is an element-level schematic diagram of one embodiment of the high pass filter 47 and the two low pass filter sections 48 of the ingress noise blocker of the present invention. Table I gives typical element values for the various inductors and capacitors in that schematic which result in the performance curves discussed below with respect to FIGS. 8 through 12.

TABLE I

Typical Element Values for Filter Circuit of FIG. 20

| Capacitors | | | Inductors | |
|---|---|---|---|---|
| C1 | .01 | uf | L1 | 390nH |
| C2 | 36 | pf | L2 | 150nH |
| C3 | 36 | pf | L3 | 220nH |
| C4 | 47 | pf | L4 | 330nH |
| C5 | 51 | pf | L5 | 390nH |
| C6 | .01 | uf | L6 | 220nH |
| C7 | 240 | pf | L7 | 220nH |
| C8 | 75 | pf | | |
| C9 | 43 | pf | | |
| C10 | 75 | pf | | |
| C11 | 33 | pf | | |
| C12 | 33 | pf | | |
| C13 | 33 | pf | | |
| C14 | 33 | pf | | |
| C15 | 75 | pf | | |

To enable visualization of the circuit elements shown here with the blocks in FIG. 4, the corresponding elements have been enclosed within broken lines and identified with the same reference numbers used in FIG. 4, as well as the circuit diagram having been laid out in the same configuration. Thus, along the top of FIG. 20 there is high pass filter 47 between terminals 40 and 40' with a serial DC blocking capacitor at each terminal. In the lower portion of FIG. 20 are the two low-pass filter sections 48 and 48', each having a series inductor extending upward to also connect with a different DC blocking capacitors 41. Intermediate each of low pass filter sections 48 and 48' in the lower path are two terminals 52 and 54 which correspond to the lines with the same reference numbers in FIG. 4 between which remotely operable attenuating device 50 is connected.

Figure 8:
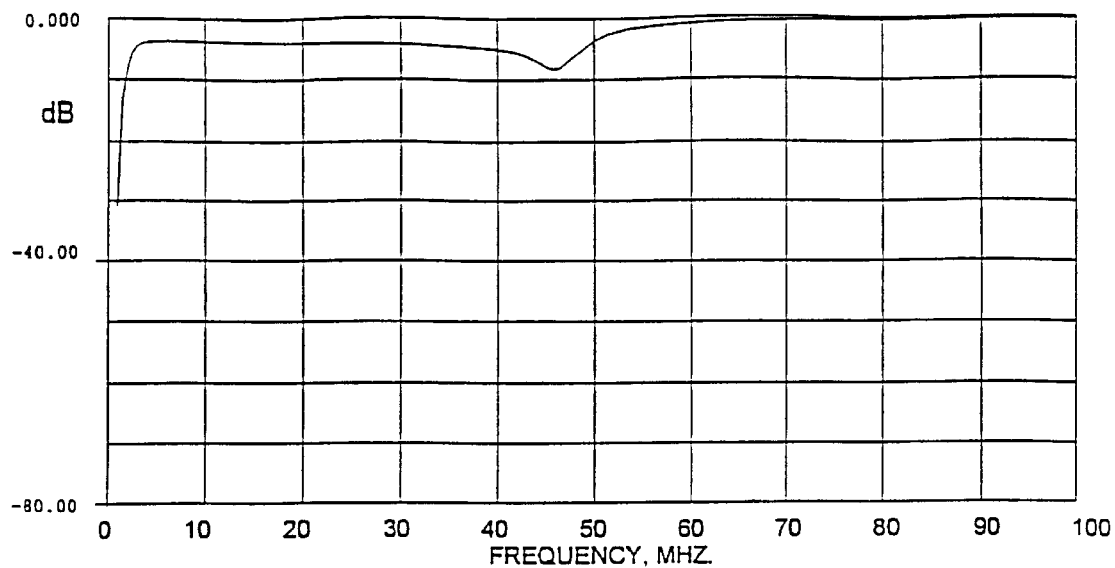
FIG. 8 is a graph showing the attenuation in d of the ingress noise blocker of the embodiment of FIGS. 4 through 7 with the switch conducting to allow passage of upstream signals.
Figure 9:
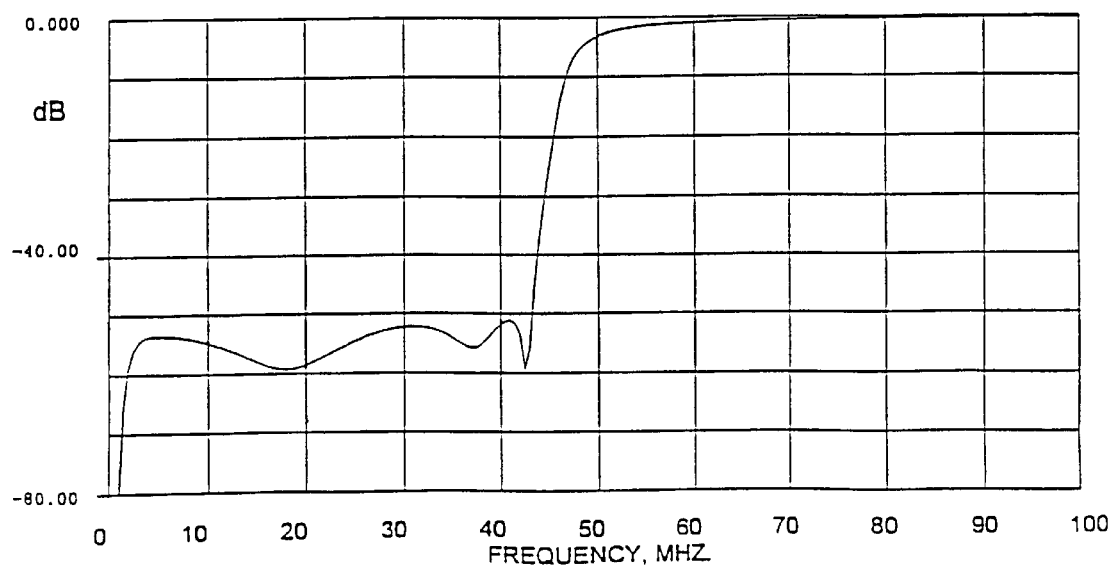
FIG. 9 is a graph as in FIG. 8 with the switch non-conductive, thus not allowing the passage of upstream signals.

In FIGS. 8 through 12, the modelled performance of noise ingress blocker 45 of FIGS. 4 through 7 and 20 is illustrated graphically. In FIGS. 8 and 9 the overall signal rejection is illustrated over 0 Hz to 100 MHz frequency range to focus on the performance at two specific frequencies, namely, 42 and 54 MHz—the highest frequencies of the conventional cable television upstream band and the lowest frequency of the downstream bandwidth of the TV band on a conventional cable. In FIG. 8 the overall response in dB is shown with switch 50 (gate 66 conductive) closed completing the circuit of the switch section 46 of ingress noise blocker 45. The rejection in the upstream frequency range (low pass range) is only about 3 dB, whereas the signal rejection in the downstream frequency range (high pass range), is on the order of 1 dB. The scale of the signal strength in the graphs of FIGS. 8 through 12 is 10 dB per division.

Similarly in FIG. 9 the overall response is shown with switch 50 (gate 66 non-conductive) open in switch section 46 with the rejection in the upstream frequency range (low pass range) being between 50 dB and 60 dB. Additionally, the rejection in the downstream frequency range (high pass range) remains on the order of 1 dB or less.

From FIGS. 8 and 9 several observations can be made. First there is little or no effect on the high frequency downstream signals presented by switching the lower frequency upstream signals in the low pass path section of ingress noise blocker 45. Whether or not the low pass path is conductive or non-conductive (i.e, since the signal rejection in the downstream band is substantially equal whether gate 66 is conductive or non-conductive) there is no visible impairment of the downstream TV signals as observed on a television picture. Further, when the low pass section is not conductive there is sufficient rejection to permit the use of more bandwidth-efficient modulation techniques in the upstream direction. Therefore the cable system can accommodate many more upstream subscribers on the same feeder cable, which can mean significant revenue sources can be added.

Figure 10:
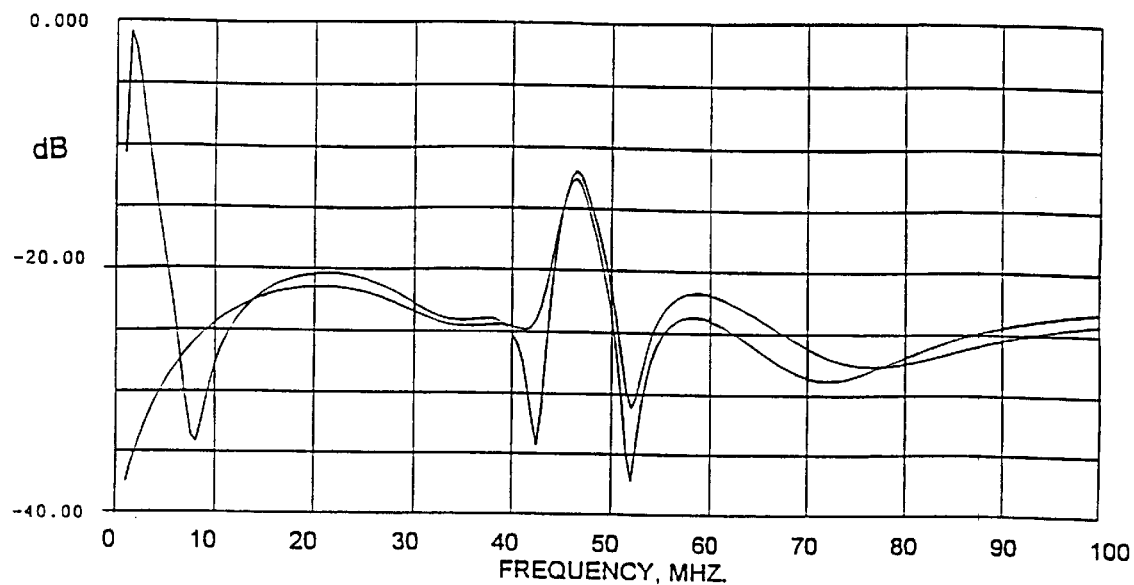
FIG. 10 is a graph showing the return loss in dB of the ingress noise blocker with the switch non-conductive, thus blocking the upstream signals. Two separate curves are shown:one measured at the input terminals and the other highly similar curve at the output terminals.
Figure 11:
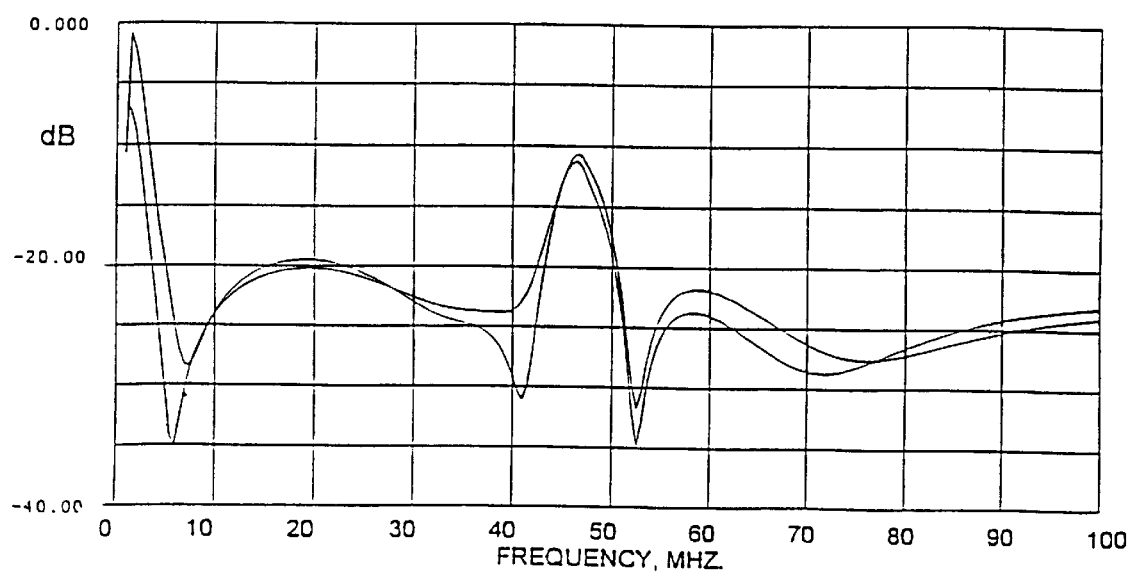
FIG. 11 is a graph as in FIG. 10 with the switch conducting, allowing the passage of upstream signals.
Figure 12:
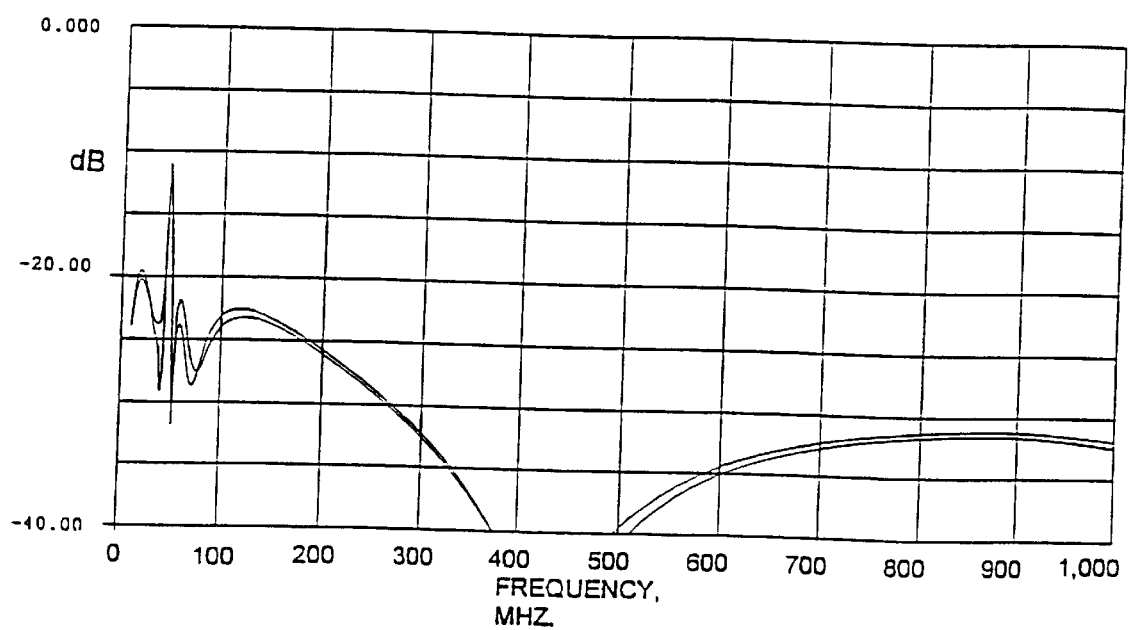
FIG. 12 is a graph of the return loss as in FIG. 10 shown over an extended frequency range of from 100 MHz to 1,000 MHz.

In FIGS. 10 through 12, an additional performance requirement of ingress noise blocker 45 is examined. In each of FIGS. 10 through 12 the reflected signal suppression (return loss) of the constant impedance gate 66 (FIG. 5) with respect to frequency is shown. The curves in FIG. 10 were modelled with gate 66 conducting, and in each of FIGS. 11 and 12 gate 66 is nonconductive. One of the two separate curves shown is for measurements at the input terminals and the other the output terminals of ingress noise blocker 65. Within the two bands of interest (5–42 MHz and 54–550 MHz, the loss is an excellent minimum of 20 dB. The fact that the return loss levels are substantially the same when gate 66 is both conductive and non-conductive is an indication as to how close the impedance of gate 66 matches the impedance of the overall system in each of those two states, which is a condition necessary for maintaining good digital data communications performance.

FIG. 13 is provided to illustrate a low cost approach to the incorporation of the ingress noise blockers of the present invention in the operation of a TV cable system. While FIG. 13 may look similar to FIG. 3, it differs in that in FIG. 13 each of the subscribers connected to the representative tap 20 is individually shown with either a simple high pass filter 44 or an ingress noise blocker 45 of the present invention. For subscribers that have purchased only downstream TV service (the outside connections in this illustration), filter 44 is in series between tap 20 and drop cable 24. (For clarity and convenience only one drop cable 24 is shown in this illustration, However, in actual operation, there would be a separate drop cable to each subscriber.) Filter 44 is an illustration of a mere high pass filter 44 shown here with a four-pointed star. For those subscribers that have also purchased upstream services, there would instead be an ingress noise blocker 45, in a cylindrical package, marked here for example with a five pointed star (the two inside connections in this illustration), which is coupled in series between tap 20 and the drop cable 24. The physical size and shape of the inventive ingress noise-blocker 45 can be the same size as the conventional cylindrical high pass filter 44, adding further to its potential use. This arrangement and positioning is desirable because upstream noise can originate in any subscriber's facility, whether or not the subscriber has rights to the services available with upstream transmission capability. Additionally conventional high pass filters 44 are less expensive than ingress noise blockers 45 of the same configuration.

FIGS. 14a and 14b are timing diagrams that illustrate two different signals (voltage versus time) used in the present invention. FIG. 14a illustrates the time duration of an upstream transmitted packet time interval of approximately 250 microseconds in length. FIG. 14b is shown in time alignment with FIG. 14a to illustrate the periods of time that gate 66 must be conductive (i.e., the duration of the remotely-initiated control tone—the sum of the period for the preceding initiation of switching of approximately 50 microseconds and the duration of the transmitted packet of approximately 250 microseconds) for a combined time of approximately 300 microseconds.

The remote control signal must be started or transmitted sufficiently in advance of the packet signal so that resonant circuit 58 (FIG. 5) which has a high Q can have sufficient time to settle before the 1 MHz tone signal generates a maximum output signal applied to rectifier 60.

Figure 15:
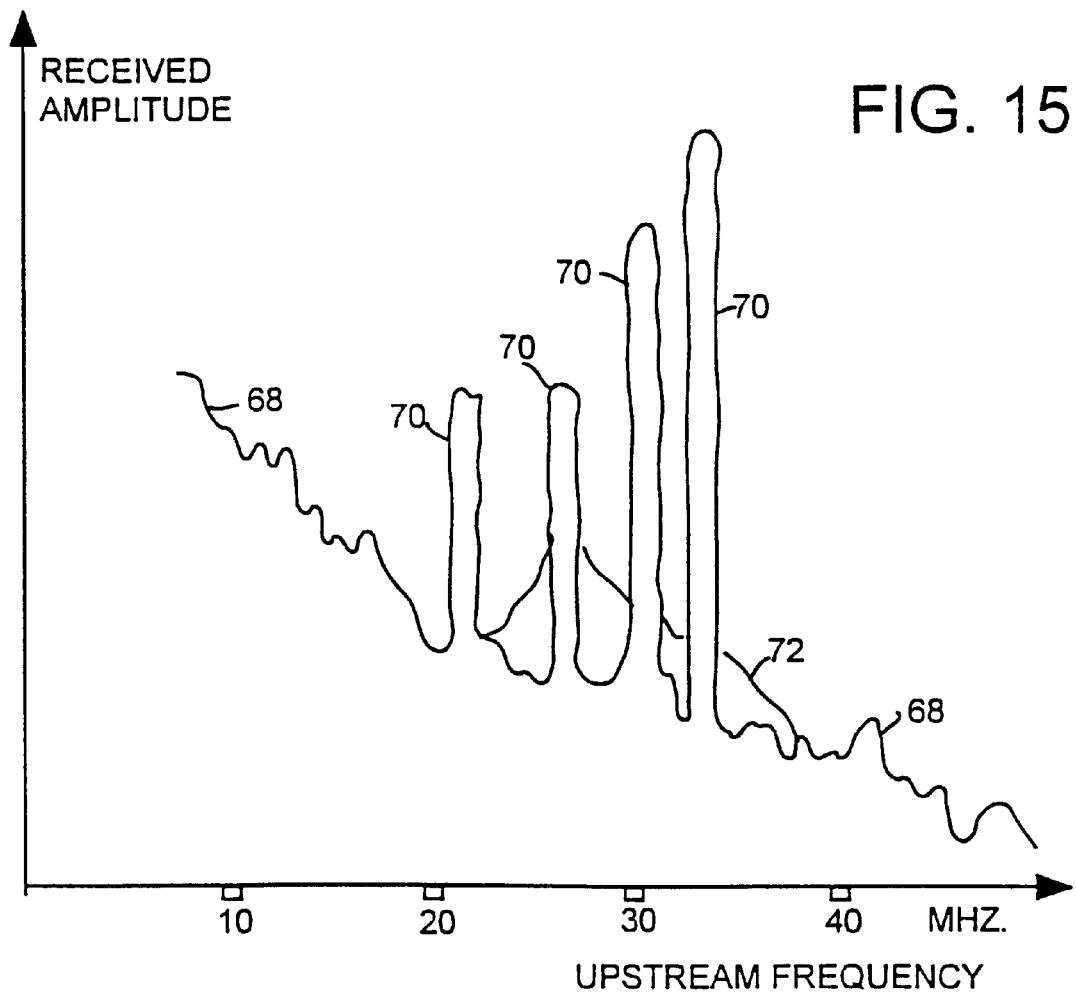
FIG. 15 is an amplitude versus frequency curve showing how the incremental noise addition caused at various subscriber's facilities is used to locate the source of ingress noise.

FIG. 15 illustrates the relative potential intensity of upstream noise from various sources given a point of ingress of the various noises in the upstream frequency range of 5 MHz to 42 MHz. Here, signals received at the headend are seen in an amplitude versus frequency display. General background noise 68 occurs across the band due to cable system internal losses and sources with the intensity of this noise tending to drop off in most TV cable systems as frequency increases.

Upstream carrier signals 70 are the various subscriber upstream signals. Intermittent noise 72 has sources that are generally localized and from one or more subscriber facility. According to the invention, correlating this noise with a priori knowledge of which subscriber is authorized to transmit upstream when noise 72 occurs will permit pinpointing of the source of that noise. Noise 72 originating within a subscriber's facility tends to be transitory thus presenting a major diagnostic problem for TV cable systems that the present invention seeks to minimize.

According to the invention the process to specifically identify which subscriber is the source of noise 68 is automated. FIG. 16 is a block diagram of the portion of the overall TV cable system used by the present invention to pinpoint which subscriber terminal unit (STU) is the source of ingress noise 72.

FIG. 16 is a simplified block diagram of the TV cable system seen as a whole. The bottom block represents equipment at head end 12. Data 78 to be transmitted downstream is shown to be generated locally in this simplified drawing while in practice it would likely come from an external source. Data 78 is sent via downstream transmitter 80 on shared bidirectional TV cable subsystem 38, more specifically via feeder cable 16 and thence to ingress noise blocker 45 and through a drop cable to the subscriber's facility.

At the subscriber's facility, the downstream signal is split off with a broad base signal splitter 100. Next a high pass filter 82 sends downstream signals to data receiver 84, in the subscriber's data modem. The received data 86 is sent to microcontroller 88 and then is available for multiple purposes. Some data is used for internal control of the modem, for example, for commands to change the frequency of transmitter 94. Another representative command might be an authorization to transmit, based in part on information in a buffer 90 holding data to be sent and an incoming authorization message from headend 12. In this case, microcontroller 88 sends out a signal first turning on the remote control signal generator 92. After a short delay then the data from buffer 90 is fed to transmitter 94 with a remote control signal preceding the data transmission assuring that the switching function of ingress noise blocker 45 is properly performed prior to receipt of the date.

As discussed above, in some TV cable systems, subscribers transmit upstream on a shared frequency only when an authorization signal is issued from headend 12. This is to prevent two or more signals of the same frequency from different subscribers sent at the same time from interfering with each other.

At headend 12 the upstream signal is received by receiver 100 with the received data 102 sent to signal processing elements (not shown) for further disposition. Simultaneously, the received upstream signal is also received by receiver 104 and processed to determine the presence of noise 72 (blocks 104, 74 and 108) before being transmitted to a system data base for further consideration.

In addition to diagnosing the upstream signal and identifying the source of any noise present, the diagnosis is conducted knowing which subscriber terminal unit (STU) is the source of the upstream signal since the headend 12 had authorized the transmission and retained the STU identity at block 76. Thus, if it is determined that noise 72 in the received upstream signal occurred during the authorized time period that the upstream signal from that STU was being sent, then that STU is the source of the noise. This identification information can then be used to dispatch technicians to identify and eliminate the noise source, or perhaps in the case of a troublesome STU, instruct the STU table (authorized to transmit) 76 not to authorize upstream transmissions from that STU until the problem has been resolved.

The processing function takes place in the processor which keeps a record of each STU versus each of a range of frequencies that they were authorized to transmit upstream using. The operation performed is to seek a correlation between a particular STU authorized to transmit and an increase in noise 72 at another frequency at the same time. This is a statistical function and requires taking measurements over many time periods to avoid false correlations. Two separate signals, denoted 201 and 202, are shown being input to a diagnostics management center 109, and having information about the performance of each STU in the system. Signal 201 indicates no correlation and signal 202 conveys correlations. In practice, the diagnostic management data center 110 would communicate with a system database (not shown).

Figure 17:
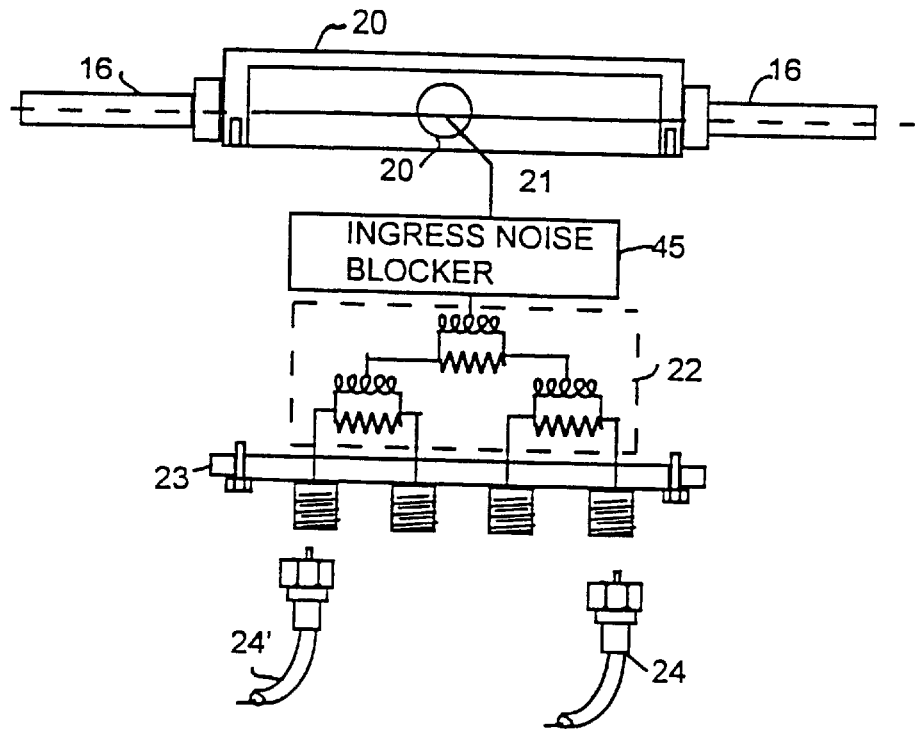
FIG. 17 is a partially exploded view of a feeder tap of a TV cable system with ingress noise blockers of the present invention incorporated therein.

FIG. 17 is a partially exploded block diagram of a feeder tap 20 with a noise ingress blocker 45 of the present invention connected between a tap 21 and a four-way splitter 22 with ingress noise blocker 45 and splitter 22 both physically attached to connector base plate 23. In this example it should be understood that four connectors and four-way-splitter 22 are shown for convenience and that the actual number may vary in actual installations with no loss in the functioning or concept of the functioning. It should be further noted that since it may be possible for each subscriber modem to be set to send an upstream signal at a different frequency, the embodiment shown here can be used even with all of the subscribers sending upstream signals at the same time. The objective herein is to reduce costs by sharing a single ingress noise blocker 45 over four subscriber facilities instead of having a separate ingress noise blocker for each one as described earlier.

Additionally, if any subscriber connected to tap 20 has not subscribed to the upstream option, that subscriber will not lose any performance since switching noise has been "designed out" of ingress noise blocker 45; to such a subscriber ingress noise blocker 45 will be transparent.

Figure 18:
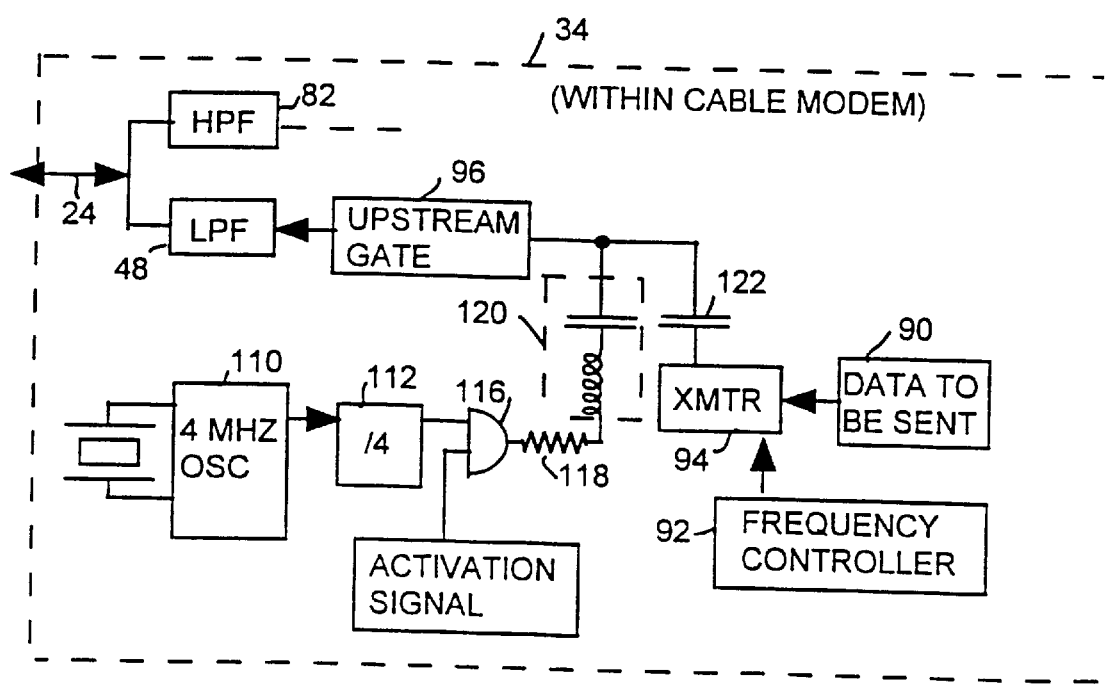
FIG. 18 is a schematic diagram illustrating the insertion of the remote control signal that precedes a data packet being transmitted upstream from a subscriber's facility.

FIG. 18 is a block diagram of a portion of a subscriber's facility 26 within the cable modem from FIG. 16 having added components to implement the incorporation of the remote control signal preceding the upstream signal.

One embodiment to add a remote control signal to the upstream signal includes transmitter 94, under the control of frequency controller 92, shown with data 90 to be sent upstream being applied to transmitter 94. In series with the output line from transmitter 94, capacitor 122 combines a lower frequency tone with the signal from transmitter 94. The 1 MHz tone with low even harmonics, is generated from a 4 MHz oscillator 110 with the 4 MHz signal divided by a factor of four resulting in the output signal from divider 112 being a 1 MHz square wave signal. The resultant square wave 1 MHz signal is next applied to one input terminal of RF gate 116 with the 1 MHz signal passing from gate 116 when the activation signal from microcontroller 88 in FIG. 16 is enabled. The duration of the 1 MHz signal tone added to the upstream signal is determined by the microcontroller 88 in FIG. 16.

In series with the output terminal of gate 116 is a 75 ohm impedance matching resistor 118 and a tuned circuit 120, tuned to the 1 MHz frequency of the desired tone.

Tuned circuit 120 in turn is connected to the input terminal of upstream gate 96, as is DC blocking capacitor 122. Under control of the micro-controller 88, or equivalent, a 1 MHz tone of approximately 300 msec in duration is added to proceed, and to last throughout, transmission of the upstream packet.

Referring next to FIG. 19, and comparing that figure with FIG. 18, it can be seen that the two schematics are substantially the same. Two differences are apparent: in FIG. 19 a DC voltage is applied to gate 116, instead of the 1 MHz AC tone shown in FIG. 18. Second, the capacitor in the series tuned circuit 120 of FIG. 18 is removed. The inclusion of FIG. 19 illustrates the other forms of remote control signals for the ingress noise blocker of the present invention, other than a 1 MHz tone.

Figure 21:
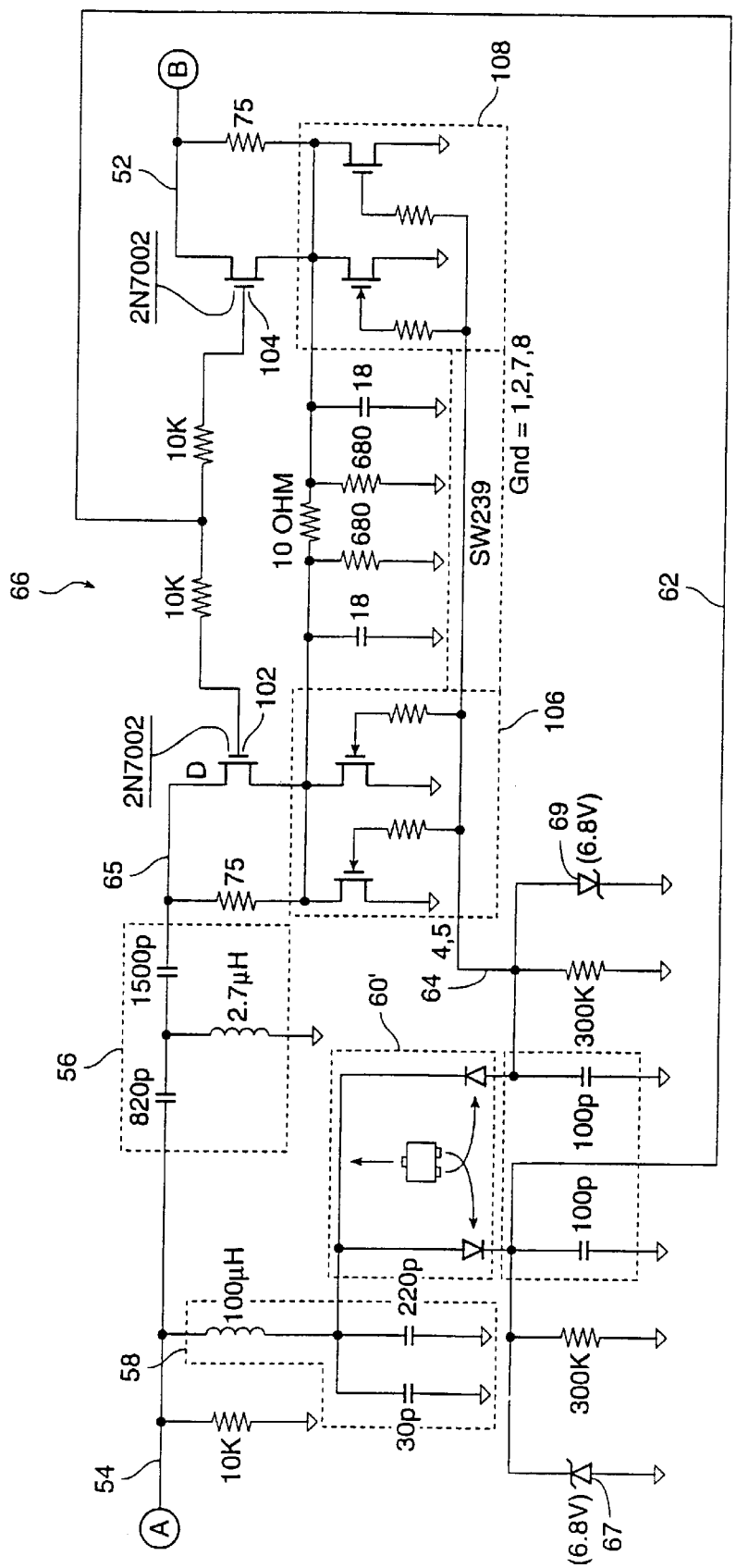
FIG. 21 is a detailed schematic diagram of the switched attenuator or switching circuit of the ingress noise blocker of FIG. 4.

Referring finally to FIG. 21, there is shown a detailed schematic diagram of the smart switching element 50 according to the invention and corresponding to the element 50 shown in FIG. 4 and represented in various levels of detail in FIG. 5, FIG. 6 and FIG. 7. According to the invention, depletion mode FETs 102 and 104 are provided which can be instantly powered by rectified low voltage d.c. signals on lines 62 and 64 from rectifier 60' across capacitor 62 whose voltage is regulated by Zener diode 67. Junction FETs 106 (pair 1) and 108 (pair 2) are powered off of ground level. The negative power is via rectified signals on line 64 regulated by Zener diode 69. Switches 102 and 104 are powered on line 62 and activated to conduct signals in response to pilot tone of 1 MHz applied at +5 dBm on line 65, which also carries the packet signals from line 54 (not shown). Contemporaneously, normally closed switches 106 and 108 are opened by the same rectified tone applied on line 64. With the switches 102, 104 closed and switches 106 and 108 open, the outgoing signals from the subscriber can pass to the headend. Absent the tone, the open switches close and the closed switches open, thereby blocking any spurious ingress noise from passing upstream to terminal/line 52.

The following definitions are offered to ensure that the terms used in the claims are well established:

"bidirectional TV cable system":
a system comprised of two subsystems, a subscriber subsystem and a shared bidirectional transmission system, where one or more frequencies below 50 MHz is used for upstream transmission and one or more frequencies above 50 MHz is used for downstream transmission.

"downstream":
that direction of transmission away from the cable head end toward the subscriber facilities. Downstream signals are generally TV video images and digital signals on rf carriers.

"ingress noise blocker":
a normally open switch or attenuator blocking the transmission of upstream energy in a bidirectional TV cable system, except during the interval following receipt of a remote control signal generated local. (42)

"remote control signal":
a signal emanating from a cable modem or other device at the subscriber's facility to remotely activate an ingress noise blocker.

"remotely operable attenuation device":
the switching portion of the ingress noise blocker activated by the remote control signal. The remotely operable attenuation device supports a switching function that maintains an impedance match to avoid line reflection and loss of transmission quality.

"shared bidirectional subsystem":
the well-shielded and ingress-protected bidirectional transmission path to and from a cable headend including taps, feeder cable and optionally, fiber cable.

"subscriber subsystem":
a subsystem comprising one or more devices in a subscriber's facility and their connected cables and splitters.

"upstream":
that direction of transmission from the subscriber facilities to the cable head end. Upstream signals are generally subscriber generated data signals on rf carriers.

"visible switching artifact":
visible impairments to downstream TV images as viewed at the output device caused by transients generated by the switching function within the ingress noise blocker. While the ingress noise filter of the present invention in the preferred embodiment has been discussed as being located in series with the,drop cable of a single subscriber, the same ingress noise filter could be employed at any point in the TV cable, for example any of locations A, B, C, D, E, F, G and H shown in FIG. 1. One skilled in the art is therefore free to locate an ingress noise filter of the present invention at the location where it is deemed optimum performance will be achieved given the specific system configuration.

Although the descriptions above primarily discuss the use of present generation implementation techniques, some specific technologies involved in the preferred embodiments of the present invention are expected to evolve with time. Further, as will be understood by those familiar with the art, the present invention may be embodied in other specific forms without departing from the spirit or essential characteristics thereof. The scope of the present invention therefore in its full interpretation is only to be limited by the scope of the claims appended hereto.

What is claimed is:

1. An ingress noise blocker to be used in a bidirectional TV cable system having a headend, said ingress noise blocker comprising:

a high pass filter for passing downstream, from said headend, signals above a predefined frequency said ingress noise blocker being connected serially between a shared bidirectional subsystem and a subscriber subsystem outside of the premises of said subscriber subsystem; and a bypass section connected in parallel across said high pass filter, said bypass section including:

a low pass filter means for passing, upstream to the headend, signals from the subscriber subsystem and for blocking transmission of switching artifacts above said preselected frequency which originate on the subscriber side of said bypass section; and a remotely operable attenuator serially connected to said low pass filter to selectively pass upstream signals in response to receipt by said attenuating device of a locally-originated remote control signal via said serial connection, said attenuating device being powered by said remote control signal, said remotely operable attenuator including a tone detector to monitor said remote control signal for presence of a tone having a frequency lower than a lowest frequency in any upstream signal frequency band, said tone providing said control signal and said power, a gate section in said remotely controllable attenuator and serially coupled to said low pass filter, said gate section being non-conductive to upstream signals in absence of applied power of said control signal and conductive upon application of power in the form of said control signal; and a rectifier circuit coupled to said gate section and to said tone detector to convert a detected tone into a DC power signal that powers said gate section in response to said tone without the need of an internal or an external power source;

wherein said low pass filter includes:

a first low pass filter section; and a second low pass filter section serially connected with said first low pass filter section and having substantially the same response characteristics as said first low pass filter section; and wherein said remotely operable attenuator is serially connected intermediate said first and second low pass filter sections, said attenuator incorporating therein a depletion mode FET switch suited to being powered on through energy from a rectified signal applied to said signal line.

2. The ingress noise blocker as in claim 1 wherein said bypass section further includes a selectable upstream attenuator connected serially intermediate said first low pass filter section and said remotely operable attenuating device, said selectable upstream attenuator disposed to match an optimum signal level to be applied to said shared bidirectional TV cable subsystem and to further reduce ingress noise.

3. An ingress noise blocker as in claim 2 having a worst case return loss in excess of 14 dB in both an upstream frequency band and a downstream frequency band, as measured with said remotely operable attenuating device conductive and non-conductive.

4. An ingress noise blocker as in claim 2 wherein said remotely operable attenuating device has a response time that is less than the sweep time of a single TV horizontal line.

\* \* \* \* \*